(12) United States Patent
Manholm et al.

(10) Patent No.: US 12,176,627 B2
(45) Date of Patent: Dec. 24, 2024

(54) METHOD AND SYSTEM FOR MAST SWAY COMPENSATION

(71) Applicant: Telefonaktiebolaget LM Ericsson (publ), Stockholm (SE)

(72) Inventors: Lars Manholm, Gothenburg (SE); Göran Nilsson, Hisings Backa (SE); Arne Alping, Kållered (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 329 days.

(21) Appl. No.: 17/795,633

(22) PCT Filed: Feb. 26, 2020

(86) PCT No.: PCT/SE2020/050218
§ 371 (c)(1),
(2) Date: Jul. 27, 2022

(87) PCT Pub. No.: WO2021/173050
PCT Pub. Date: Sep. 2, 2021

(65) Prior Publication Data
US 2023/0075873 A1 Mar. 9, 2023

(51) Int. Cl.
*H01Q 3/34* (2006.01)
*H01Q 1/00* (2006.01)
(Continued)

(52) U.S. Cl.
CPC .............. *H01Q 3/34* (2013.01); *H01Q 1/005* (2013.01); *H01Q 1/1257* (2013.01); *H01Q 3/02* (2013.01); *H04B 17/21* (2015.01); *H04B 17/318* (2015.01)

(58) Field of Classification Search
CPC ........ H01Q 3/34; H01Q 1/005; H01Q 1/1257; H01Q 3/02; H04B 17/21; H04B 17/318; H04B 7/06952; H04B 17/12
See application file for complete search history.

(56) References Cited

U.S. PATENT DOCUMENTS 5,894,291 A * 4/1999 Lee ...................... H01Q 1/1242
343/890
8,160,831 B1 * 4/2012 Rausch ................ H01Q 1/1257
342/359
(Continued)

FOREIGN PATENT DOCUMENTS

WO WO-2019118116 A1 * 6/2019 ............... H01Q 1/14

OTHER PUBLICATIONS

Veijalainen, T., "Beam steering in millimeter wave radio links for small cell mobile backhaul", Master's Thesis, Aalto University School of Electrical Engineering, Espoo, May 17, 2014, pp. 1-101, Aalto University.

*Primary Examiner* — Angelica Perez
(74) *Attorney, Agent, or Firm* — COATS & BENNETT, PLLC

(57) ABSTRACT

A method for compensating a movement of an antenna structure having a directive antenna mounted thereto is disclosed. The method comprises obtaining sensor data from a motion sensor, where the sensor data is indicative of the movement of the antenna structure relative to a reference orientation. Moreover, the motion sensor is associated with a set of calibration parameters such that when applied to the obtained sensor data, calibrated sensor data is formed. Further, the method comprises generating a compensation signal at an output for controlling a beam direction of the directive antenna based on the formed calibrated sensor data such that the beam direction is an intended direction of the directive antenna and such that the (unwanted) movement of the antenna structure is compensated. The method further comprises re-calibrating the motion sensor in order to generate a set of calibration coefficients upon either one of an expiry of a predefined time period, a counter reaching a counter threshold, or upon a measured antenna parameter or signal parameter diverging from a parameter range. Once, (Continued)

one of these conditions are fulfilled, the re-calibration is performed by obtaining a received signal strength indication (RSSI) while the beam direction is controlled based on the generated compensation signal, generating the set of calibration coefficients based on the obtained RSSI, and updating the set of calibration parameters for the motion sensor with the determined set of calibration coefficients.

18 Claims, 5 Drawing Sheets

(51) Int. Cl.
  *H01Q 1/12* (2006.01)
  *H01Q 3/02* (2006.01)
  *H04B 17/21* (2015.01)
  *H04B 17/318* (2015.01)

(56) References Cited

U.S. PATENT DOCUMENTS

| | | | |
|---|---|---|---|
| 2005/0275597 A1* | 12/2005 | Tian | H01Q 3/06 343/757 |
| 2010/0311457 A1* | 12/2010 | Johansson | H01Q 3/30 342/372 |
| 2012/0064841 A1* | 3/2012 | Husted | H04B 7/086 455/78 |
| 2013/0040682 A1 | 2/2013 | Chang et al. | |
| 2013/0321225 A1 | 12/2013 | Pettus | |

\* cited by examiner

METHOD AND SYSTEM FOR MAST SWAY COMPENSATION

TECHNICAL FIELD

The present disclosure relates to methods and systems for compensating movement of an antenna structure having a directive antenna mounted thereto.

BACKGROUND

As smart phones and other portable devices increasingly become ubiquitous, and data usage increases, macro-cell base station devices and existing wireless infrastructure in turn require higher bandwidth capability in order to address the increased demand. Future wireless communications systems (such as 5G and LTE Advanced Pro) are therefore required to provide increased bandwidth and reduced latencies compared to current system.

Accordingly, there is a drive for longer hops for radio links at E-band (71-86 GHz) and above. One obvious way to achieve this is to increase the antenna gain by using larger antennas. One drawback with higher gain antennas is the resulting narrower beams.

Deployments with narrow beam widths are more susceptible to misalignments due to, e.g., mast or platform instability, but also initial antenna alignment. Mast instability is typically sway and twist due to wind or solar irradiation. Thus, the antenna structure (i.e. mast) must have a relatively high mechanical stability in order to allow the narrow beams of the high gain antennas to maintain aligned. This leads to an increased bulkiness and cost for the mast, the antenna installation, and an increased complexity of the antenna site in general.

There is accordingly a need for improvements in the art, and in particular for reliable and cost effective antenna arrangements having high-gain narrow beam-width antennas.

SUMMARY

It is therefore an object of the present disclosure to provide a method for compensating a movement of an antenna structure having a directive antenna mounted thereto, a computer-readable storage medium, a corresponding system, and an antenna arrangement which alleviate all or at least some of the above-discussed drawbacks of presently known solutions.

This and other objects are achieved by means of a method for compensating a movement of an antenna structure having a directive antenna mounted thereto, a computer-readable storage medium, a corresponding system, and an antenna arrangements. The term exemplary is in the present context to be understood as serving as an instance, example or illustration.

According to a first aspect of the present disclosure, there is provided a method for compensating a movement of an antenna structure having a directive antenna mounted thereto. The method comprises obtaining sensor data from a motion sensor, where the sensor data is indicative of the movement of the antenna structure relative to a reference orientation. Moreover, the motion sensor is associated with a set of calibration parameters such that when applied to the obtained sensor data, calibrated sensor data is formed. Further, the method comprises generating a compensation signal at an output for controlling a beam direction of the directive antenna based on the formed calibrated sensor data such that the beam direction is an intended direction of the directive antenna and such that the (unwanted) movement of the antenna structure is compensated. The method further comprises re-calibrating the motion sensor in order to generate a set of calibration coefficients upon either one of an expiry of a predefined time period, a counter reaching a counter threshold, or upon a measured antenna parameter or signal parameter diverging from a parameter range. Once, one of these conditions are fulfilled, the re-calibration is performed by obtaining a received signal strength indication (RSSI) while the beam direction is controlled based on the generated compensation signal, generating the set of calibration coefficients based on the obtained RSSI, and updating the set of calibration parameters for the motion sensor with the determined set of calibration coefficients.

A mast sway estimation/compensation method for radio link antennas is disclosed, where the beam direction is determined using a hybrid of motion sensors and a signal Angle-of-Arrival, (AoA) estimation using, e.g. the Received Signal Strength Indication (RSSI).

With the proposed hybrid method, the speed requirement on the beam steering is reduced by an order of magnitude or more compared to other known RSS tracking-only solutions, and also compared to other known "hybrid" methods. This may have positive implications on the beam steering system, especially if the beam steering involves mechanical moving parts of or the whole antenna.

Further, in accordance with an exemplary embodiment of the present disclosure, the step of obtaining the RSSI comprises sweeping the beam of the directive antenna in at least one dimension while measuring the RSS over a first time period dependent on a frequency of the movement of the antenna structure.

Moreover, in accordance with another exemplary embodiment of the present disclosure, the step of obtaining the RSSI further comprises averaging the measurement of the RSS over the first time period. Non-ideal target tracking will introduce an angular variation, assumingly with similar frequency as the mast sway (the measured RSS will have a time variation which is somewhat unsymmetrical around nominal, due to the curvature of the antenna beam pattern). Thus, to improve the accuracy of the received power measurement, it may be advantageous to measure over a time period of several cycles of the antenna movement frequency and average the received power.

Still further, in accordance with yet another exemplary embodiment the step of generating a compensation signal is only performed if the obtained sensor data indicates that a frequency of movement is within a frequency range. This may be advantageous in order to inhibit a beam steering caused by noise or some other random vibrations that are clearly not mast sway or twist due to wind or solar irradiation.

According to a second aspect of the present disclosure, there is provided a computer-readable storage medium storing one or more programs configured to be executed by one or more processors of a processing device, the one or more programs comprising instructions for performing the method according to any one of the embodiments disclosed herein. With this aspect of the disclosure, similar advantages and preferred features are present as in the previously discussed first aspect of the disclosure.

According to another aspect of the present disclosure, there is provided a non-transitory computer-readable storage medium storing one or more programs configured to be executed by one or more processors of a processing device, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present disclosure, there is provided a system for compensating a movement of an antenna structure having a directive antenna mounted thereto. The system comprises a motion sensor configured to generate sensor data indicative of the movement of the antenna structure relative to a reference orientation, where the motion sensor is associated with a set of calibration parameters. The system further comprises a receiver module (RX module) connected to the directive antenna and configured to measure a received signal strength indication (RSSI), and control circuitry. The control circuitry is configured to obtain the sensor data and apply the calibration parameters in order to form calibrated sensor data, and to generate a compensation signal at an output for controlling a beam direction of the directive antenna based on the formed calibrated sensor data such that the beam direction is an intended direction of the directive antenna and such that the movement of the antenna structure is compensated for. Moreover, the control circuitry is configured to re-calibrate the motion sensor in order to generate a set of calibration coefficients upon the expiry of a predefined time period, upon a counter reaching a counter threshold, or upon a measured antenna parameter diverging from a parameter range. The re-calibration is done by obtaining a signal indicative of the RSS while the beam direction is controlled based on the generated compensation signal, generating the set of calibration coefficients based on the obtained signal indicative of the RSS, and updating the set of calibration parameters for the motion sensor with the determined set of calibration coefficients. With this aspect of the disclosure, similar advantages and preferred features are present as in the previously discussed first aspect of the disclosure.

According to a fourth aspect of the present disclosure, there is provided an antenna arrangement comprising a directive antenna, an antenna structure for supporting the directive antenna, and a system according to any one of the embodiments disclosed herein. With this aspect of the disclosure, similar advantages and preferred features are present as in the previously discussed first aspect of the disclosure.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
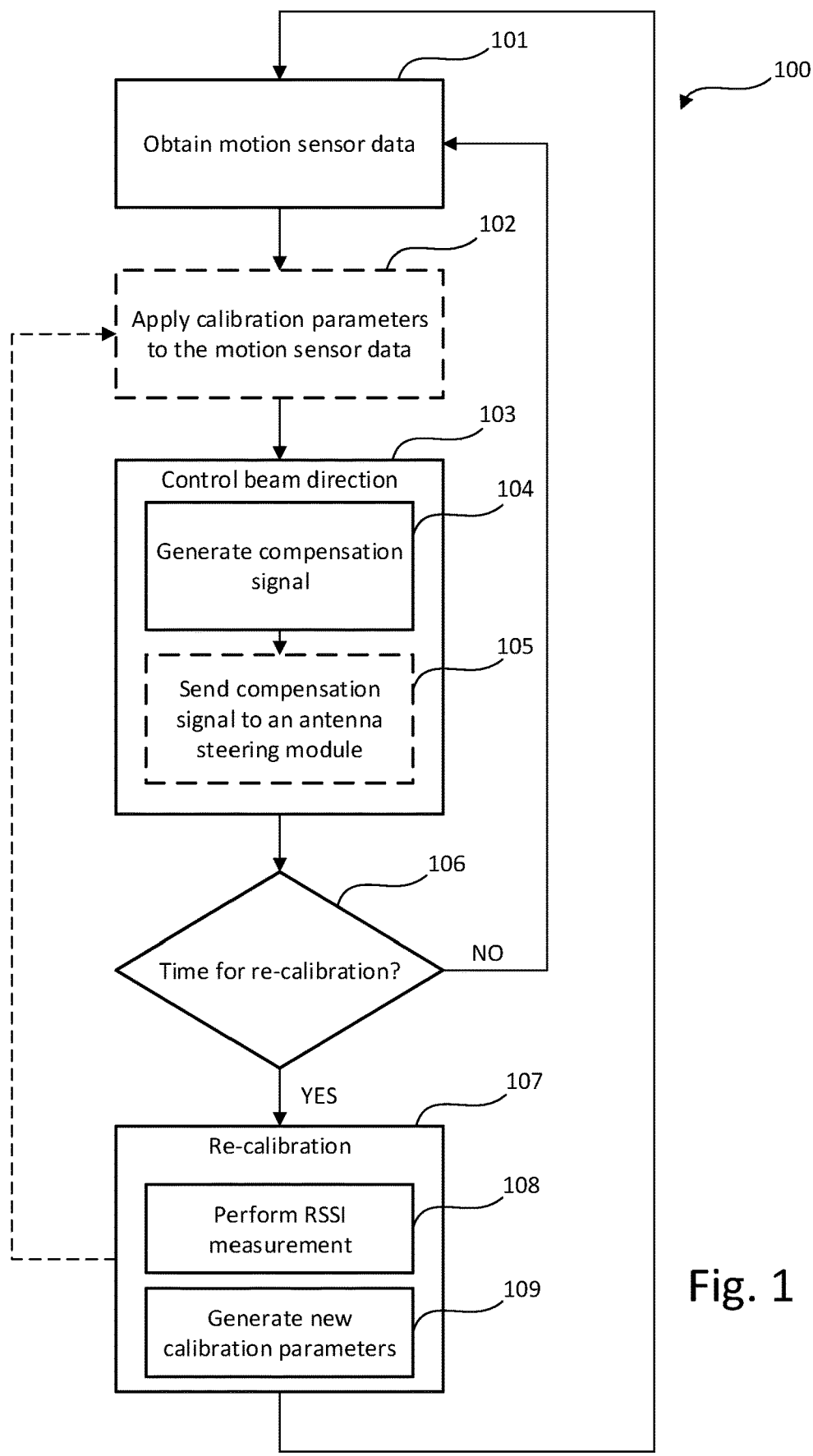
FIG. 1 is a schematic flow chart representation of a method for compensating a movement of an antenna structure having a directive antenna mounted thereto in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 is a schematic flow chart representation of a method 100 for compensating a movement of an antenna structure having a directive antenna mounted thereto. More specifically, the method 100 is suitable for compensating for mast sway or twist caused by wind or solar irradiation. The method 100 comprises obtaining 101 motion sensor data from a motion sensor. The obtained 101 motion sensor data is indicative of a movement of the antenna structure (e.g. mast) relative to a reference orientation.

The motion sensor is arranged to monitor a movement of the antenna structure and may comprise one or more of at least one accelerometer, at least one gyroscope, and at least one magnetometer. Each of these sensors (accelerometer, gyroscope, and magnetometer) may be understood as low-level motion sensors which can be combined in various ways to form a high-level motion sensor or a fusion sensor.

Moving on, the motion sensor is associated with a set of calibration parameters such that when applied to the obtained sensor data, calibrated sensor data is formed. In some embodiments, the motion sensor has built-in compute resources allowing it to carry out a calibration and sensor fusion at the hardware level (which frees up computational resources and lowers battery consumption in the process). However, the calibration and/or sensor fusion may also alternatively be carried out in software. For example if it cannot be done at the hardware level or if an application specific fusion-algorithm is required. These calibration parameters can be construed as some type of drift-compensation in hardware caused by adjacent hardware on the circuit. Accordingly, in some embodiments, the method 100 further comprises applying 102 the calibration parameters to the motion sensor data or motion sensor signal in order to obtain the calibrated sensor data.

Further, the beam direction of the directive antenna is controlled 103 by means of a control signal based on the calibrated sensor data. More specifically, the method 100 comprises generating 104 a compensation signal at an output for controlling a beam direction of the directive antenna based on the formed calibrated sensor data such that the beam direction is an intended direction of the directive antenna (i.e. such that the movement of the antenna structure is compensated for). The intended direction may for example be towards a target node in a wireless communication system. In some embodiments, the method 100 further comprises sending 105 or transmitting 105 the compensation signal to an antenna steering module so to control the beam direction of the directive antenna.

In some embodiments, the method 100 may further comprise filtering the calibrated sensor data prior to the generation 104 of the compensation signal. Accordingly, the generated 104 compensation signal may be based on the filtered calibration sensor data. The filtering may be model based or non-model based. For example, one model based filtering method is to utilize a Kalman filter in order to filter the calibrated sensor data.

Still further, the method 100 comprises re-calibrating 107 the motion sensor in order to generate a set of calibration coefficients (i.e. new calibration parameters) upon:

The expiry of a predefined time period (e.g. every 5 seconds, every 10 seconds, every minute, or the like),
a counter reaching a threshold value, or
a measured antenna parameter or signal parameter (KPI-value) diverging from a (predefined) parameter range (e.g. a received signal strength falling below a threshold value).

In other words, a check 106 is performed to see if it is time for a re-calibration of the motion sensor, if not, the method 100 is repeated from the start, and if it is time for a re-calibration, then the re-calibration process 107 is executed. The predefined time period may also be set depending on the quality of the motion sensor or motion sensor data.

The re-calibration 107 is performed by obtaining 108 a Received Signal Strength Indication/Indicator (RSSI) while the beam direction is controlled 103 based on the generated 104 compensation signal. Stated differently, an RSSI is obtained 108 while the beam direction is controlled based on the calibrated sensor data. An RSSI (may sometimes be referred to as Received Signal Strength, RSS) is typically a measurement of the power present in a received radio signal. The RSS values are generally measured in dBm and have typical negative values ranging between 0 dBm (excellent signal) and −110 dBm (extremely poor signal).

Further, the re-calibration procedure 107 includes, generating 109 the set of calibration coefficients (new calibration parameters), and updating the calibration parameters for the motion sensor with the determined set of calibration coefficients (as indicated by the broken arrow). In other words, the previously used calibration parameters in order to generate 102 the calibrated sensor data are overwritten based on the RSSI measurement 108. The terms coefficients and parameters are here used in an ambiguous manner for clarity and readability and should not be construed as limiting to the scope of the present disclosure.

Accordingly, the herein proposed solution uses a motion sensor (Inertial Measurement Unit (IMU), gyro, accelerometer, or some other means) to directly control the beam direction, and an RSS-based tracking, that is performed from time to time, to recalibrate the motion sensor's offset due to drift. As already exemplified, the re-calibration may be performed periodically or aperiodically (e.g. based on a KPI exceeding a threshold, which may not occur at regular intervals). In more detail, the time interval for when a recalibration of the motion sensor is needed may depend on several factors, such as, e.g. the drift of the used motion sensor(s), the acceptable estimation error, how often it is acceptable to perform the calibration, how much one can filter the motion sensor output, e.g. by applying some model based filtering like a Kalman filter, etc.

Moreover, an advantage with the proposed "hybrid" solution where the motion sensor is used for mast sway and twist compensation and the RSSI measurement only for re-calibration, the speed requirement on the beam steering is reduced by an order of magnitude or more compared to RSS tracking only or any other systems where the sway/twist compensation is based on the RSS tracking directly. Thus, this may have positive implications on the beam steering system, especially if the beam steering involves mechanical moving parts of the antenna or the whole antenna.

In more detail, RSS only based tracking algorithms/systems (e.g. what in radar is known as a "conical scanning") requires very fast beam steering in order not to lose the tracking; typically one order of magnitude higher than the dominant frequency of the mast sway. If the requirement on beam steering speed can be reduced, that would have positive implications on the beam steering system, especially if the beam steering involves mechanically moving parts or a mechanically moving antenna.

Moreover, cost-effective motion sensors, e.g. consumer grade Inertia Measurement Units (IMUs) suffer from a large drift when used for direction estimation. This drift comes from bias and random noise in accelerometer and gyro sensors, which is then integrated over time, causing ever increasing position and direction estimate errors. Without any kind of recalibration, the error will eventually become unacceptably large.

Thus, the RSS-based tracking and motion sensor based tracking suffer from inherent drawbacks, wherefore it was realized by the present inventors that by providing a "hybrid solution", the individual weaknesses of the two can be at least partly alleviated while their individual strengths can still be utilized. Moreover, in some embodiments, the re-calibration is done by obtaining an Angle of Arrival (AoA)

estimation by any suitable means (e.g. RSSI, a laser, or any other signal indicative of the AoA of an intended target), whereupon the set of calibration coefficients is generated based on the AoA estimation, and the set of calibration parameters are accordingly updated based on these calibration coefficients.

Figure 2:
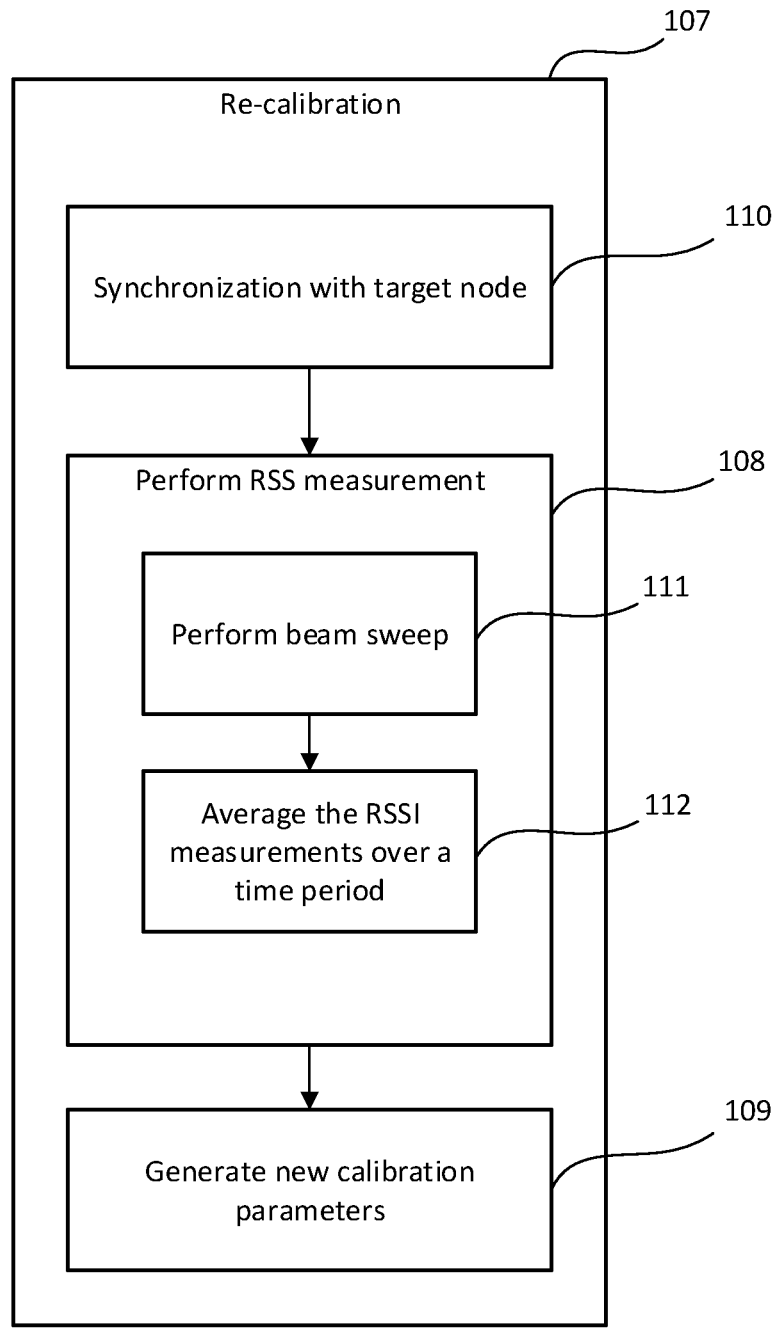
FIG. 2 is a schematic flow chart representation of a re-calibration step of a method for compensating a movement of an antenna structure having a directive antenna mounted thereto in accordance with an embodiment of the present disclosure.

FIG. 2 is a schematic flow chart representation of the re-calibration process 107 in accordance with an embodiment of the present disclosure. In more detail, in some embodiments, the step of obtaining 108 the RSSI while the beam direction is controlled based on the generated compensation signal comprises sweeping 111 a beam of the directive antenna in at least one dimension while measuring the RSS in order to obtain a relationship between the beam direction and the measured RSS. The obtained relationship between the beam direction and the measured RSS is subsequently used to determine the set of calibration coefficients. Preferably, the sweeping 111 is done in two dimensions, i.e. up/down and left/right. Moreover, the term "sweeping" is to be interpreted broadly and may be referred to as a scan that may be done in discrete steps (i.e. the beam may be stepped to the left, right, up, and down) or as a continuous motion. The sweeping 111 of the beam may for example be performed by controlling a 2D rotating platform onto which the directive antenna is arranged or, if the directive antenna is in the form of an Electronically Steered Array (ESA) antenna, by controlling the individual antenna elements in the ESA antenna.

Further, in some embodiments the antenna beam sweep may be performed over a first time period dependent on a frequency of movement of the antenna structure (e.g. the frequency of the mast sway). Accordingly, the RSS measurement 108 may be averaged 112 over the first time period. The averaging 112 of the measurements may improve the accuracy of the RSS measurement. Preferably, the first time period includes several cycles of the movement of the antenna structure (e.g. mast sway), over which the RSS measurement is performed and subsequently averaged over this time period.

Figure 3A:
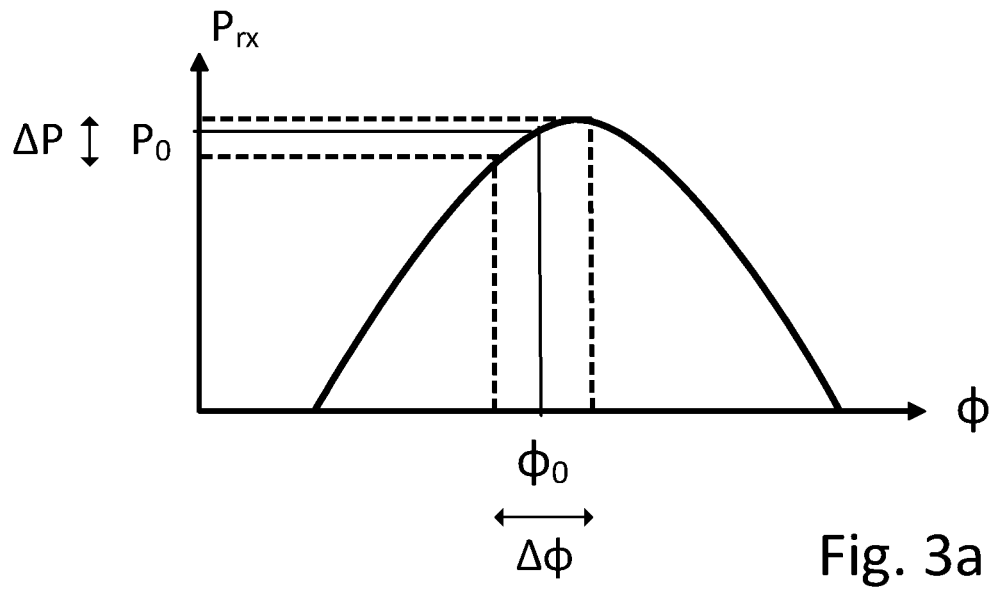
FIG. 3a is a schematic plot illustrating RSS variation with beam pointing angle due to antenna beam shape in accordance with an embodiment of the present disclosure.
Figure 3B:
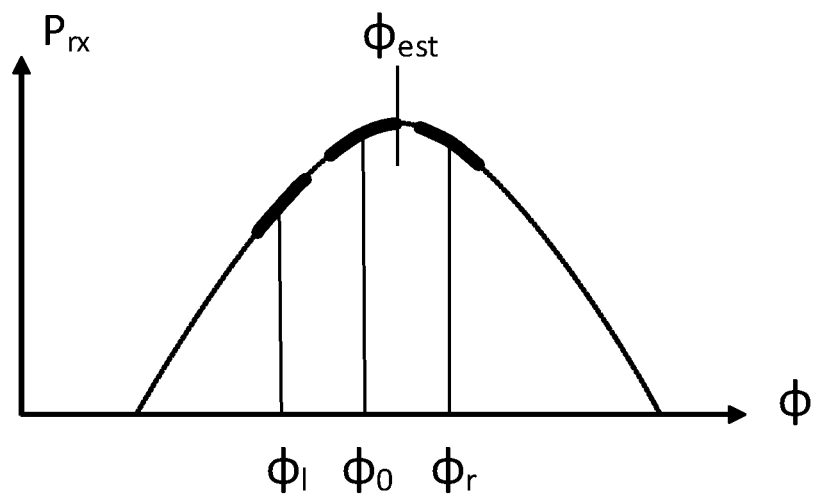
FIG. 3b is a schematic plot illustrating RSS as the beam of the directive antenna is swept in one dimension in accordance with an embodiment of the present disclosure.

The beam sweep 111 will be further discussed in reference to FIGS. 3a-3b. FIGS. 3a-3b are schematic plots of the RSSI with respect to a beam angle, serving to further elucidate some embodiments of the beam sweeping.

FIG. 3a shows how the received power $P_{rx}$ (RSSI) varies with the beam pointing angle $\phi$ due to the antenna beam pattern. In more detail, due to imperfect beam tracking when the antenna structure (e.g. mast) is swaying, the actual pointing direction $\phi$ varies within a range $\Delta\phi$ around the nominal pointing direction $\phi_0$. As a result, the received power $P_{rx}$ also varies within a range $\Delta P$ around the nominal value $P_0$.

Further, FIG. 3b illustrates how the received power $P_{rx}$ can vary during the re-calibration procedure when the nominal beam direction changes from $\phi_0$, to $\phi_l$, and $\phi_r$ as the actual beam direction varies around those directions due to residual "pointing" errors. In more detail, FIG. 3b shows how the received power varies when the antenna beam is stepped to the left (indicated by $\phi_l$) and to the right (indicated by $\phi_r$). Accordingly, in order to improve the accuracy of the RSSI measurement, it may be advantageous to measure over a time period of several cycles of the sway (i.e. over several periods of the frequency of the antenna structure's movement). The purpose of the measurement is to estimate a "new" nominal direction $\phi_{est}$ based on which the calibration coefficients are generated. In other words, the re-calibration of the motion sensors includes updating the estimated direction to the far-end with a new estimate. One can also estimate the gyroscope or accelerometer bias, and perhaps also other motion sensor parameters.

Going back to FIG. 2, in some embodiments, the intended direction of the directive antenna is towards a target node (e.g. another network node in a wireless communication system). Thus, the method may further comprise a synchronization step 110, where the timing of the re-calibration 107 of the directive antenna is controlled so to not disturb a corresponding calibration of the target node. Thus, the method may further comprise obtaining communication data indicative of a timing and duration of a calibration procedure of the target node. The step of re-calibrating 107 the motion sensor may accordingly be based on the timing and duration of the calibration procedure of the target node such that the re-calibration 107 of the motion sensor does not interfere with the calibration procedure of the target node.

Figure 3C:
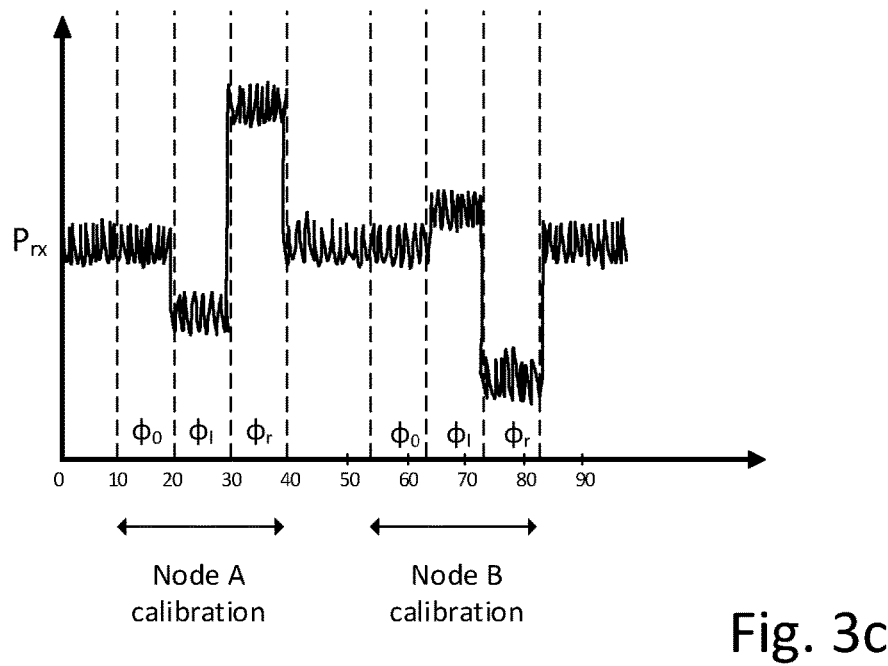
FIG. 3c is a schematic plot illustrating a synchronized re-calibration procedure of two nodes in accordance with an embodiment of the present disclosure.

Further, FIG. 3c shows a plot of the received power $P_{rx}$ over time in a re-calibration sequence involving two nodes, in one dimension. As mentioned with respect to FIGS. 3a-3b, the beam of the directive antenna is swept step-wise in one dimension, here illustrated as a horizontal calibration where the beam is stepped to the left (indicated by $\phi_l$) and to the right (indicated by $\phi_r$). In this simplified 1D illustration (FIG. 3c) of a calibration procedure, the two nodes of the link, Node A and Node B, are calibrated at different times so to not interfere with each other. The figure shows how the time interval for measuring $P_{rx}$ at each direction spans over many mast sway periods so that a good average value of $P_{rx}$ can be achieved.

Even though the plots illustrated in FIGS. 3a-3c indicate a beam sweep in one dimension (1D), it is for the purpose of readability and to reduce complexity of the drawings, and is therefore not to be construed as limiting to the present disclosure. The skilled reader readily understands that the corresponding measurements can be performed in a second dimensions, either as separate step-wise measurements, as a conical scan, or the like.

Thus, in reference to FIGS. 3a-3c, in some embodiments the re-calibration procedure may be summarized as follows:
Stepping the beam direction of the directive antenna up/down & left/right whereupon the RSS measurements are averaged over a sufficiently long time period, such as e.g. at least three periods of a lowest antenna structure movement frequency detected by the motion sensor.
Non-ideal target tracking will introduce an angular variation $\Delta\phi$, assumingly with similar frequency as the antenna structure movement frequency. In more detail, the measured RSS may exhibit a time variation which is somewhat unsymmetrical around nominal (intended direction), due to the curvature of the antenna beam pattern.
With three measurement points per dimension, as illustrated in FIG. 3b, a better RSSI value can be estimated.
Calibration of two nodes (node A and B) needs to be synchronized, so they do not occur at the same time, as illustrated in FIG. 3c.
Measure nominal, left (up) and right (down) in sequence for horizontal (vertical) dimension calibration.
Averaging over several periods of the antenna structure movement so to suppress sway and noise variations.

Executable instructions for performing these functions are, optionally, included in a non-transitory computer-readable storage medium or other computer program product configured for execution by one or more processors.

Figure 4A:
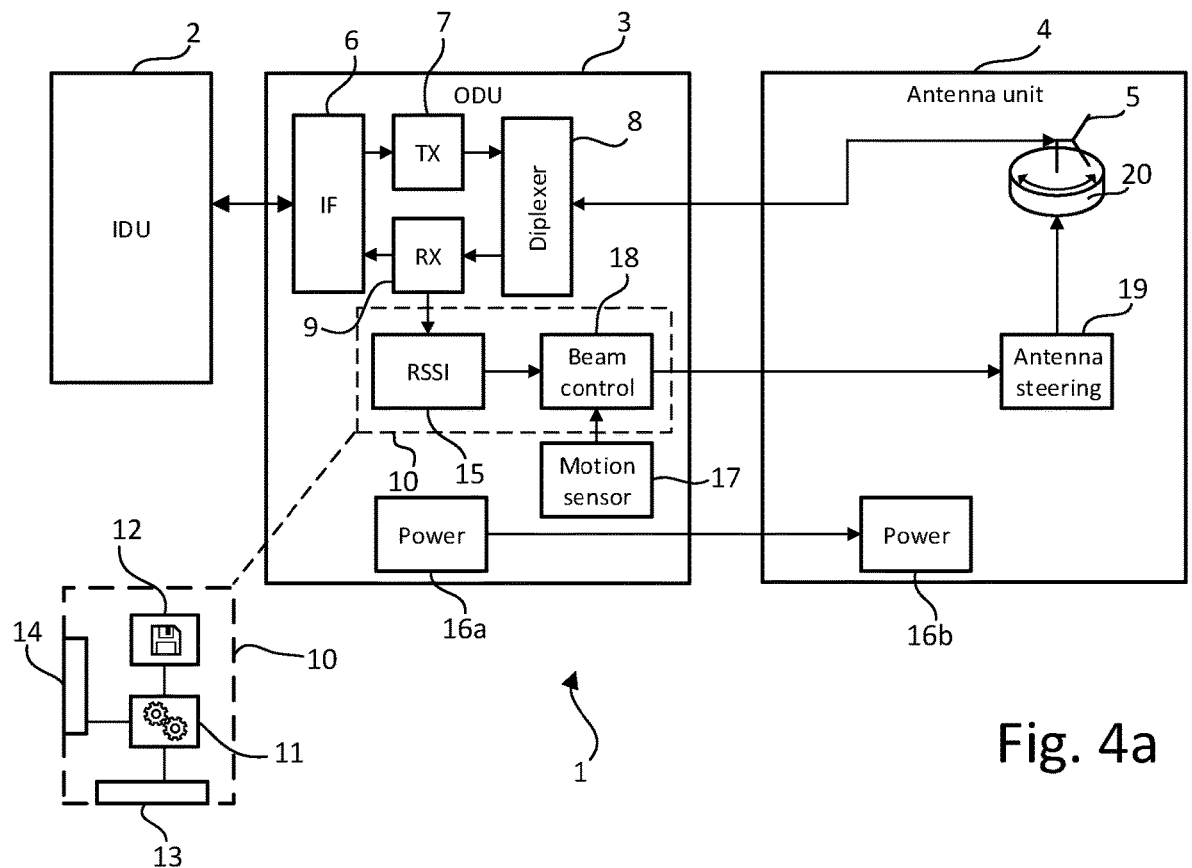
FIGS. 4a-4c are schematic block diagram representations of a system for compensating a movement of an antenna structure having a directive antenna mounted thereto in accordance with some embodiments of the present disclosure.
Figure 4B:
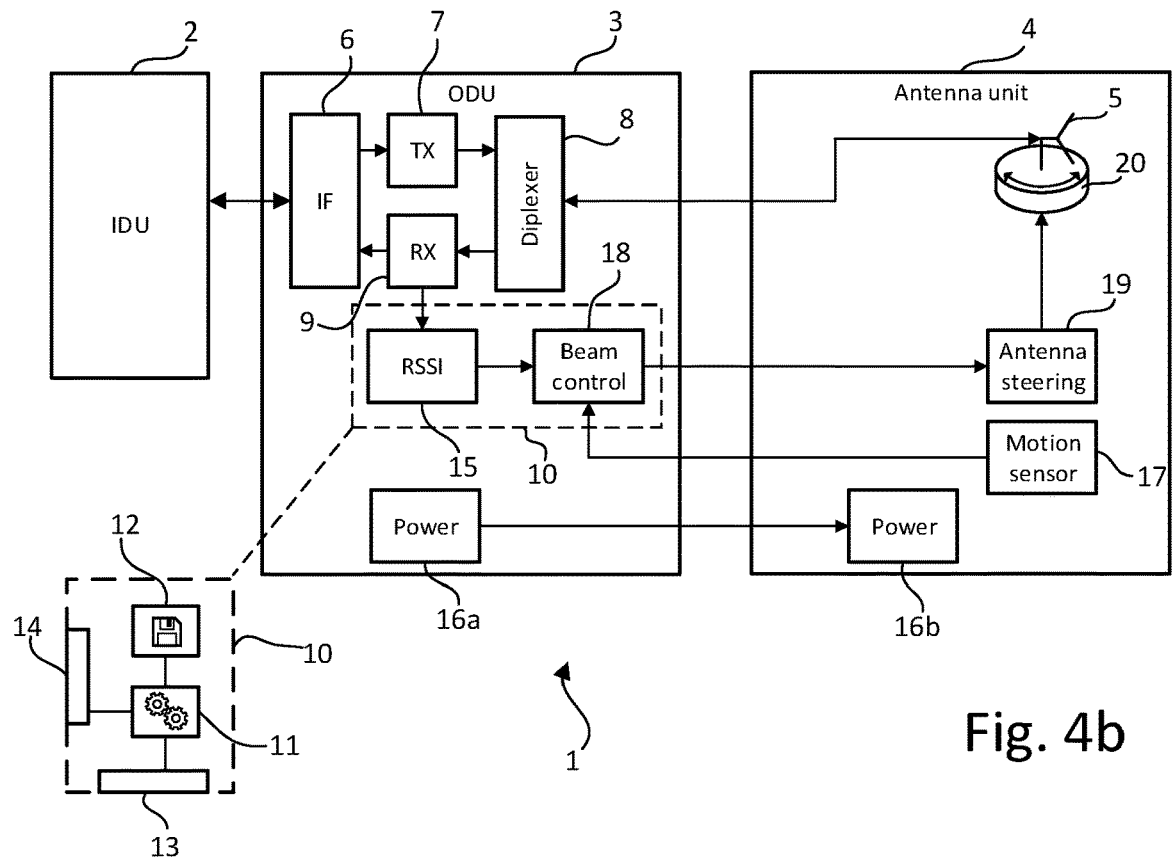
Figure 4C:
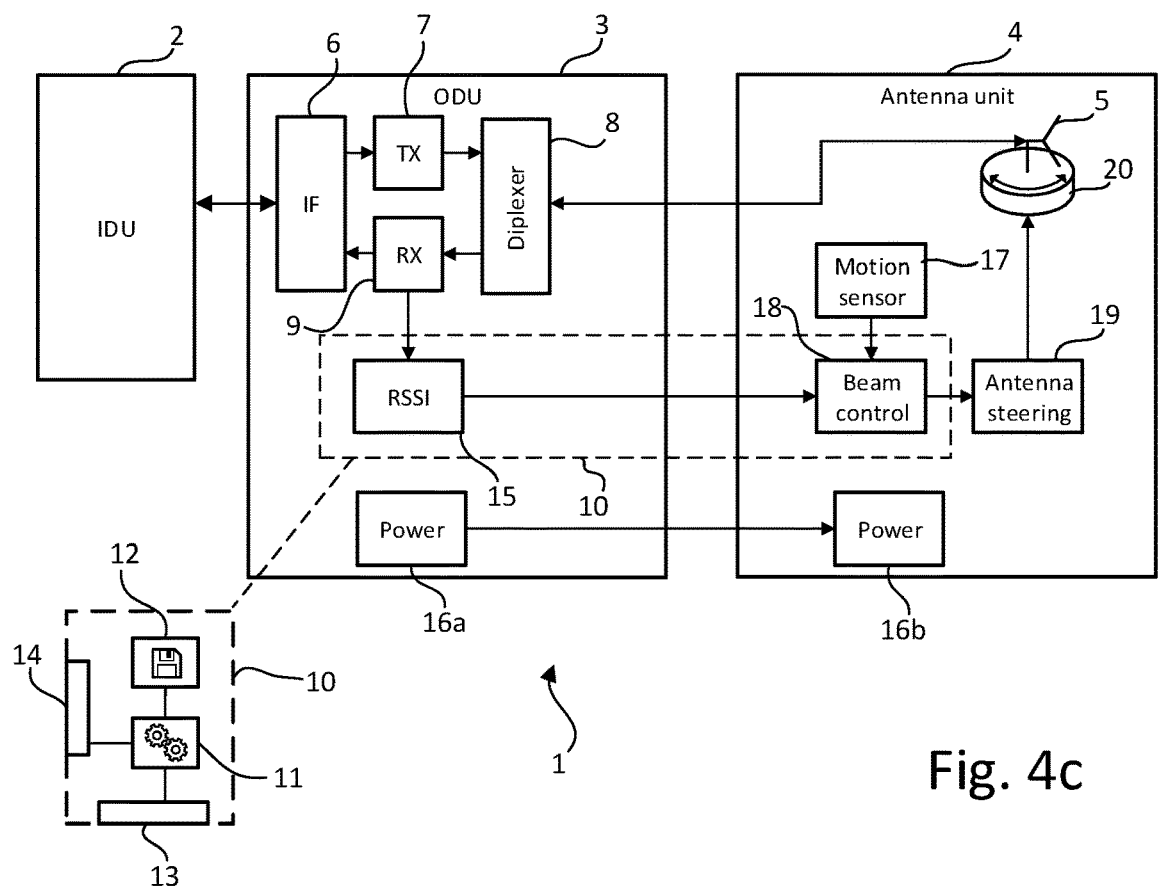

FIGS. 4a-4c are block diagram representations of a system for compensating a movement of an antenna structure having a directive antenna 5 mounted thereto in accordance with some exemplary embodiments. These FIGS. 4a-4c serve to illustrate some example partitioning of the various functional blocks of the general antenna arrangement 1, having an indoor unit (IDU) 2, an outdoor unit (ODU) 3, and an antenna unit 4.

Referring to FIG. 4a, the system comprises a motion sensor 17 (here arranged in the ODU 3) configured to generate sensor data indicative of the movement of the antenna structure relative to a reference orientation. In other words, the motion sensor 17 is arranged to detect and monitor a mast sway or twist. The motion sensor 17 is further associated with a set of calibration parameters. The system further has a receiver module (RX module) 9 connected to the directive antenna 5 (optionally via a diplexer 8) and configured to measure or obtain a received signal strength indication (RSSI).

The system further has a control device 10 connected to the motion sensor 17 and the RX module 9. The control device 10 comprises control circuitry 11 configured to obtain the sensor data and apply the calibration parameters in order to form/generate calibrated sensor data. However, in some embodiments the motion sensor is a part or module of the control device 10 and the calibration data may be applied by the motion sensor 17 directly before it is forwarded to another part of the control device 10 which is responsible for using the calibrated sensor data to generate/form the compensation signal.

Accordingly, the control circuitry 11 is configured to generate a compensation signal at an output for controlling a beam direction of the directive antenna 5 based on the formed/generated calibrated sensor data such that the beam direction is an intended direction of the directive antenna and such that the movement of the antenna structure is compensated for. The compensation signal may for example be generated by a beam control module 18 and transmitted to an antenna steering module 19 in the antenna unit 4. The antenna steering module is in turn connected a beam steering means 20 of the directive antenna. The beam steering means 20 may be mechanical beam steering means such as a rotating platform. Alternatively, if the directive antenna 5 is in the form of an ESA, the beam steering means 20 may be in the form of TRMs (transmit/receive modules), each connected to a corresponding antenna element of the ESA.

Still further, the control circuitry 11 is configured to re-calibrate the motion sensor 17 in order to generate a set of calibration coefficients upon the expiry of a predefined time period, upon a counter reaching a counter threshold, or upon a measured antenna parameter diverging from a parameter range. More specifically, the control circuitry 11 is configured to obtain a signal indicative of the RSS while the beam direction is controlled based on the generated compensation signal, generate the set of calibration coefficients based on the obtained signal indicative of the RSS, and update the set of calibration parameters for the motion sensor 17 with the determined set of calibration coefficients. This re-calibration may for example be performed by an RSSI module 15 of the control device 10. The RSSI module being connected to the RX module to obtain the RSSI.

For the sake of completeness, the ODU further has various general elements and components such as a transmission (TX) module 7, an Intermediate Frequency (IF) module 6 connected to each of the RX and TX modules 7, 9 and a power unit 16a connected to a corresponding power unit 16b of the antenna unit 16b as known in the art. However, it is assumed that the skilled person in the art readily understands the general concepts and workings of an antenna arrangement 1 wherefore any further details regarding the general operation of the antenna arrangement 1 is omitted for the sake of brevity and conciseness.

The processor(s) or control circuitry 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 14 may also provide the possibility to acquire sensor data directly or via dedicated sensor control circuitry in the system. The communication/antenna interface 13 may further provide the possibility to send output to a remote location (e.g. remote operator or control centre) by means of the antenna 5 or a secondary antenna (not shown). Moreover, some sensors in the system may communicate with the control device 10 using a local network setup, such as CAN bus, I2C, Ethernet, optical fibres, and so on. The communication interface 13 may be arranged to communicate with other control functions of the system and may thus be seen as control interface also; however, a separate control interface (not shown) may be provided. Local communication within the system may also be of a wireless type with protocols such as WiFi, LoRa, Zigbee, Bluetooth, or similar mid/short range technologies.

Further, FIGS. 4b-4c depict additional example embodiments of a system for compensating a movement of an antenna structure having a directive antenna 5 mounted thereto. The general movement compensation process and re-calibration process are analogous as with the embodiments described in the foregoing. However, FIGS. 4b-4c illustrate how the various modules responsible for controlling the processes are distributed differently.

For example, in FIG. 4b, the motion sensor 17 is arranged in the antenna unit 4 instead of the ODU 3, and in FIG. 4c also the beam control module 18 of the control device 10 is arranged in the antenna unit 4 instead of the ODU 4. However, the exact partitioning of functions between IDU 2, ODU 3, and the antenna unit 4 is considered to be of less importance for the present disclosure and readily understood by the skilled artisan that various configurations are possible and within the scope of the present disclosure.

In summary, motion sensors are used for estimating the twist and sway of the mast, i.e., the elevation and azimuth angles of the antenna unit, to which the motion sensors are attached. However, a "problem" with gyroscopes in these implementations is that they detect angle velocities, not the angles directly. To get from velocity to position, the gyro reading must be integrated over time. This means that errors, such as noise and bias, in the gyro reading will be integrated, and with time the resulting angle estimates will degrade. The same problem applies to accelerometers, which measure acceleration wherefore the reading must be integrated twice over time. Thus, using a gyroscope or accelerometer to estimate the antenna direction may work fine for tracking the fast variations of the direction, but has the inherent drawback in that the reliability of the sensor readings degrade over time, which is unacceptable in many applications. Accordingly, the motion sensor(s) need(s) to be calibrated with some defined time interval. This is then done using some other means of estimating the direction to the other node (i.e. target). More specifically, in some embodiments this direction estimation (i.e. angle of arrival (AoA) estimation) is performed by measuring the RSSI, and subsequently by analysing the RSS variation with time, a "true" pointing direction can be estimated, and the motion sensor is accordingly calibrated. Other ways to perform the AoA estimation may for example be to use a camera, a laser, or the like.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a processing device, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Accordingly, it should be understood that parts of the described solution may be implemented either in the indoor unit 2, outdoor unit 3, or antenna unit 4, in a remote system located external the system, or in a combination of internal and external the system; for instance in a server in communication with the system, a so called cloud solution. For instance, sensor data may be sent to an external system and that system performs the steps to generate the set of calibration coefficients based on the RSSI, and/or to compute the timing for the synchronized calibration with another node. The different features and steps of the embodiments may be combined in other combinations than those described.

The invention claimed is:

1. A method for compensating a movement of an antenna structure having a directive antenna mounted thereto, the method comprising:
    obtaining sensor data from a motion sensor, the sensor data being indicative of the movement of the antenna structure relative to a reference orientation, wherein the motion sensor is associated with a set of calibration parameters such that when applied to the obtained sensor data, calibrated sensor data is formed;
    generating a compensation signal at an output for controlling a beam direction of the directive antenna based on the formed calibrated sensor data such that the beam direction is an intended direction of the directive antenna and such that the movement of the antenna structure is compensated for; and
    re-calibrating the motion sensor in order to generate a set of calibration coefficients upon the expiry of a predefined time period, upon a counter reaching a counter threshold, or upon a measured antenna parameter or signal parameter diverging from a parameter range, by:
        obtaining a received signal strength indication, RSSI, while the beam direction is controlled based on the generated compensation signal;
        generating the set of calibration coefficients based on the obtained RSSI; and
        updating the set of calibration parameters for the motion sensor with the determined set of calibration coefficients.

2. The method according to claim 1, wherein the step of obtaining the RSSI comprises:
    sweeping a beam of the directive antenna in at least one dimension while measuring the RSSI in order to obtain a relationship between the beam direction and the measured RSSI; and
    using the obtained relationship between the beam direction and the measured RSSI in to determine the set of calibration coefficients.

3. The method according to claim 2, wherein the step of obtaining the RSSI further comprises:
    sweeping the beam of the directive antenna in at least one dimension while measuring the RSSI over a first time period dependent on a frequency of the movement of the antenna structure.

4. The method according to claim 3, wherein the step of obtaining the RSSI further comprises:
    averaging the measurement of the RSSI over the first time period.

5. The method according to claim 2, wherein the step of sweeping the beam of the directive antenna in at least one dimension comprises performing a conical scan with the beam of the directive antenna.

6. The method according to claim 1, wherein the step of generating a compensation signal is only performed if the obtained sensor data indicates that a frequency of movement is within a frequency range.

7. The method according to claim 1, further comprising:
    applying the calibration parameters to the obtained sensor data in order to obtain the calibrated sensor data.

8. The method according to claim 1, further comprising:
    filtering the calibrated sensor data prior to the generation of the compensation signal; and generating the compensation signal at the output for controlling the beam direction of the directive antenna based on the filtered calibrated sensor data.

9. The method according to claim 1, wherein the intended direction of the directive antenna is towards a target node, and wherein the method further comprises:
obtaining communication data indicative of a timing and duration of a calibration procedure of the target node;
wherein the step of re-calibrating the motion sensor is based on the timing and duration of the calibration procedure of the target node such that the re-calibration of the motion sensor does not interfere with the calibration procedure of the target node.

10. A non-transitory computer-readable storage medium storing one or more programs configured to be executed by one or more processors of a system for compensating a movement of an antenna structure having a directive antenna mounted thereto, the one or more programs comprising instructions configured to cause the system to:
obtain sensor data from a motion sensor, the sensor data being indicative of the movement of the antenna structure relative to a reference orientation, wherein the motion sensor is associated with a set of calibration parameters such that when applied to the obtained sensor data, calibrated sensor data is formed;
generate a compensation signal at an output for controlling a beam direction of the directive antenna based on the formed calibrated sensor data such that the beam direction is an intended direction of the directive antenna and such that the movement of the antenna structure is compensated for; and
re-calibrate the motion sensor in order to generate a set of calibration coefficients upon the expiry of a predefined time period, upon a counter reaching a counter threshold, or upon a measured antenna parameter or signal parameter diverging from a parameter range, by:
obtaining a received signal strength indication, RSSI, while the beam direction is controlled based on the generated compensation signal;
generating the set of calibration coefficients based on the obtained RSSI; and
updating the set of calibration parameters for the motion sensor with the determined set of calibration coefficients.

11. A system for compensating a movement of an antenna structure having a directive antenna mounted thereto, the system comprising:
a motion sensor configured to generate sensor data indicative of the movement of the antenna structure relative to a reference orientation, wherein the motion sensor is associated with a set of calibration parameters;
a receiver, RX, module connected to the directive antenna and configured to measure a received signal strength indication, RSSI;
control circuitry configured to:
obtain the sensor data and apply the calibration parameters in order to form calibrated sensor data;
generate a compensation signal at an output for controlling a beam direction of the directive antenna based on the formed calibrated sensor data such that the beam direction is an intended direction of the directive antenna and such that the movement of the antenna structure is compensated for; and
re-calibrate the motion sensor in order to generate a set of calibration coefficients upon the expiry of a predefined time period, upon a counter reaching a counter threshold, or upon a measured antenna parameter or signal parameter diverging from a parameter range, by:
obtaining a signal indicative of the RSSI while the beam direction is controlled based on the generated compensation signal;
generating the set of calibration coefficients based on the obtained signal indicative of the RSSI, and
updating the set of calibration parameters for the motion sensor with the determined set of calibration coefficients.

12. The system according to claim 11, wherein the control circuitry is configured to obtain the RSSI by:
sweeping a beam of the directive antenna in at least one dimension while measuring the RSSI in order to obtain a relationship between the beam direction and the measured RSSI; and
using the obtained relationship between the beam direction and the measured RSSI in order to determine the set of calibration coefficients.

13. The system according to claim 12, wherein the control circuitry is configured to obtain the RSSI by:
sweeping the beam of the directive antenna in at least one dimension while measuring the RSSI over a first time period dependent on a frequency of the movement of the antenna structure.

14. The system according to claim 13, wherein the control circuitry is configured to obtain the RSSI by:
averaging the measurement of the RSSI over the first time period.

15. The system according to claim 2, wherein the control circuitry is configured to sweep the beam of the directive antenna in order to perform a conical scan with the beam of the directive antenna.

16. The system according to claim 11, wherein the control circuitry is configured to generate a compensation signal only if the obtained sensor data indicates that a frequency of movement is within a frequency range.

17. The system according to claim 11, wherein the control circuitry is further configured to:
filter the calibrated sensor data prior to the generation of the compensation signal; and
generate the compensation signal at the output for controlling the beam direction of the directive antenna based on the filtered calibrated sensor data.

18. The system according to claim 11, wherein the intended direction of the directive antenna is towards a target node, and wherein the control circuitry is further configured to:
obtain communication data indicative of a timing and duration of a calibration procedure of the target node;
wherein the step of re-calibrating the motion sensor is based on the timing and duration of the calibration procedure of the target node such that the re-calibration of the motion sensor does not interfere with the calibration procedure of the target node.

* * * * *